April 21, 1970     I. B. COOPER, JR     3,508,031
CONTROL SYSTEM EMPLOYING CARD HAVING CONDUCTIVE INSERTS
Filed Aug. 23, 1965     3 Sheets-Sheet 1
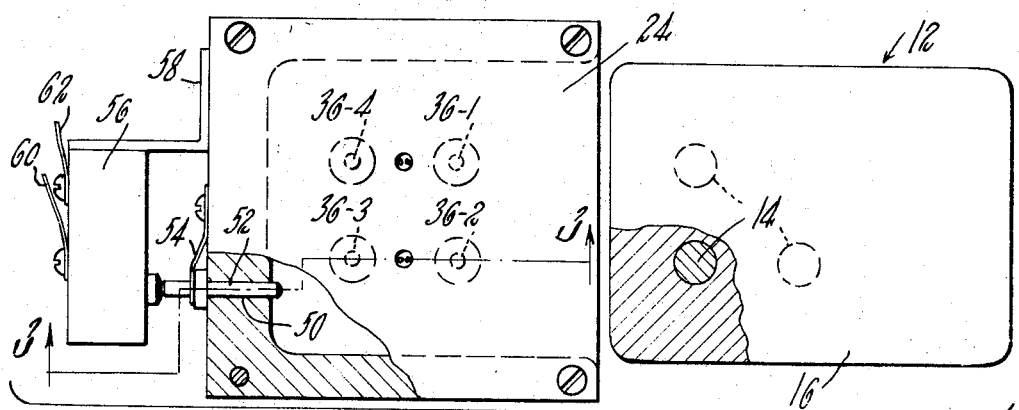
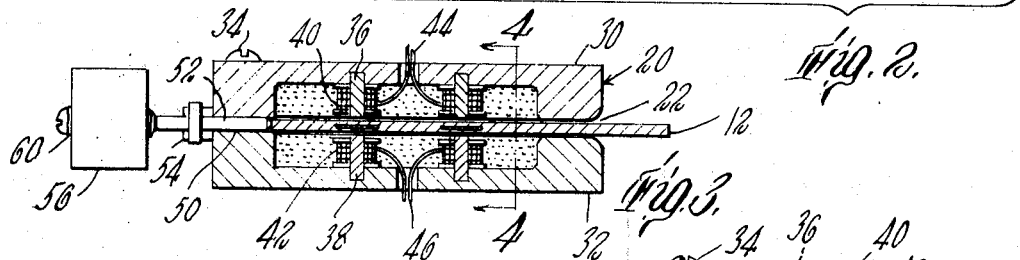
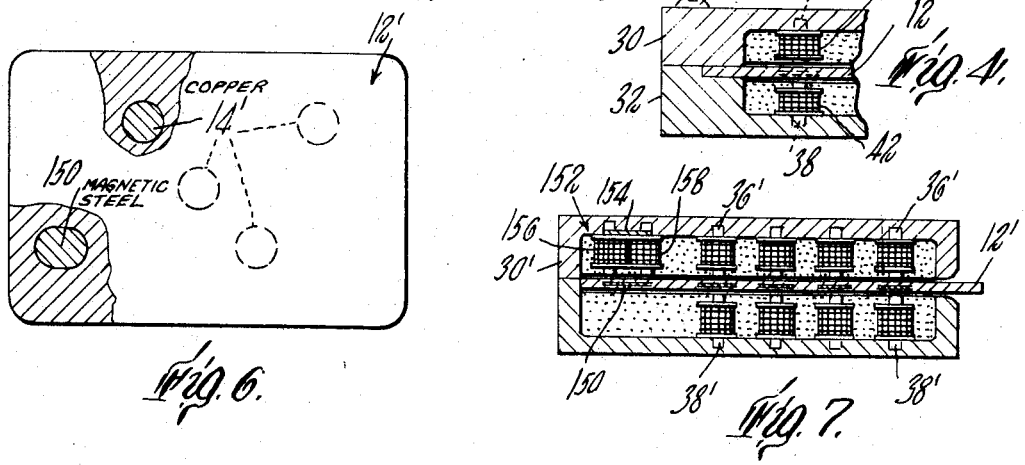
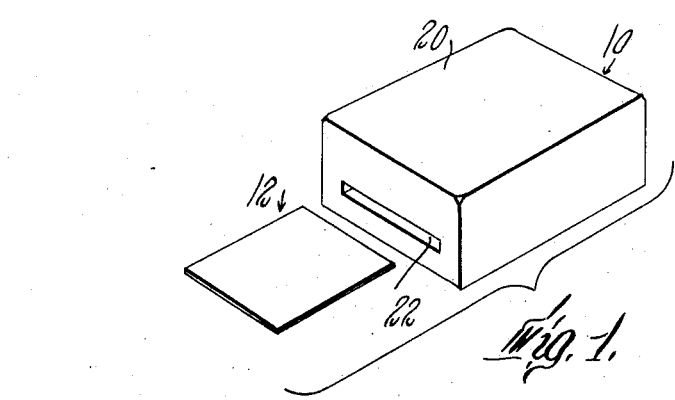

United States Patent Office 3,508,031
Patented Apr. 21, 1970

3,508,031
CONTROL SYSTEM EMPLOYING CARD HAVING CONDUCTIVE INSERTS
Irving B. Cooper, Jr., Marblehead, Mass., assignor to Industrial Instrumentations, Inc., Marblehead, Mass., a corporation of Massachusetts
Filed Aug. 23, 1965, Ser. No. 481,687
Int. Cl. G06k 7/00
U.S. Cl. 235—61.11
21 Claims

ABSTRACT OF THE DISCLOSURE

A security system includes a card having several copper discs in the order of 5 mils in thickness encased within opaque material and a card reader that has a sensing area in which the card is inserted. On one side of the sensing area are a group of primary windings disposed on pole pieces and on the opposite side of the sensing area are corresponding secondary windings, also disposed on pole pieces. The secondary windings are connected to corresponding silicon controlled rectifiers and, on insertion of a card into the reader a switch is closed which applies a pulse to the primary windings to generate magnetic fields. In response to those magnetic fields that are not absorbed by copper discs, the corresponding secondary windings generate output signals which trigger the controlled rectifiers to store the coded information on the card. On removal of the card from the sensing area, translation circuitry is actuated to operate a printer.

---

This invention relates to control systems and, more particularly, to systems that employ an article such as a card having information recorded thereon and a sensor device having a plurality of sensing elements for reading the information recorded on the article.

A variety of systems such as vending, accounting, and security control systems, frequently use a card or similar record as a control element. In such a system, a card bearing a particular arrangement of indicia is utilized with a sensing device to actuate a controlled apparatus or to record the use of an apparatus controlled by the sensing device and/or the identity of the user of that apparatus. The sensing device employed in such systems preferably requires little or no supervision so that it may be located in an unattended facility. In addition, it should function reliably and require little or no maintenance. Such a sensing system should provide a reasonably high degree of security in order to guard against unauthorized use while providing an arrangement which will not be damaged by attempted unauthorized use.

It is an object of this invention to provide novel and improved coded article sensing systems which operate reliably and with a relatively high degree of security.

Another object of the invention is to provide novel and improved card reading apparatus for reading the code on a card and activating a control circuit in response to the code applied to the card.

Still another object of the invention is to provide a novel and improved sensing device that employs a rugged and reliable card sensing structure.

Another object of the invention is to provide novel and improved apparatus for sensing and storing information encoded on an article.

Still another object of the invention is to provide a novel and improved coded article sensing system of simplified design having the ability to store data sensed from information encoded on an article at an article reading station and to transmit that stored data over relatively long distances to a central control station.

In accordance with the invention, there is provided a coded article sensing system that includes apparatus for sensing data encoded on an article, apparatus for storing the sensed data and apparatus for reading out the stored data. The article sensing apparatus includes a structure that defines an article sensing area. Disposed immediately adjacent the article sensing area are a plurality of electromagnetic sensors. The apparatus further includes means responsive to the positioning of an article in the sensing area for energizing the electromagnetic sensors for producing output pulses as a function of the data encoded on the article positioned in the sensing area. The storage apparatus includes a matrix of storage elements and the output pulses generated in response to the positioning of the article in the sensing area are applied directly to the storage elements to store the data encoded on the article. The system may further include a control that supervises a group of reader-storage units and sequentially translates data from the reader-storage units to appropriate output devices.

In the sensing apparatus described hereinafter in greater detail, each electromagnetic sensor includes a pair of flux conductor elements that are disposed in alignment on opposite sides of the article sensing area. A primary winding is mounted on one flux conductor element and a secondary or sensor winding is mounted on the aligned flux conductor element on the opposite side of the sensing area from the primary winding. There is further included, in the article sensing apparatus, means responsive to the insertion of an article into that sensing area to apply an electric signal to all the primary windings so that corresponding electromagnetic fields are generated. Each electromagnetic field is normally coupled by the flux conductor elements to the corresponding secondary windings to produce detectable output pulse signals. Each output pulse signal, however, is subject to modification as a function of the nature of material interposed between the primary and secondary windings as carried by the article positioned in the sensing area. In the preferred embodiments, the article carries discrete areas of electrically conductive material, each of which, when interposed between an aligned pair of flux conductor elements, acts as a shorted turn winding so that no detectable signal is induced in the secondary winding. Thus, in this structure, the elements carried by the article disposed in the sensing area inhibit the production of output pulse signals.

These output pulse signals are applied directly to storage elements which, in a particular embodiment described hereinafter in detail, are controlled rectifier devices, each of which is placed in condition for conduction in response to the positioning of a coded article in the sensing area and which has its conducting state modified by the production of output pulses from the sensors. The common readout system sequentially samples these storage elements and translates the data to suitable output devices for recording or actuation of controlled equipment for example.

Other objects, features and advantages of the invention will be seen as the following description of particular embodiments thereof progresses, in conjunction with the drawings, in which:

FIGURE 1 is a perspective view of a card reader apparatus constructed in accordance with the invention and a typical card configuration which may be employed therewith;

FIGURE 2 is a top view of the card reader apparatus, with parts broken away, showing details of the card sensing area, and a typical configuration of a card that may be employed with the apparatus;

FIGURE 3 is a sectional view taken along the line 3—3 of FIGURE 2;

Figure 5:
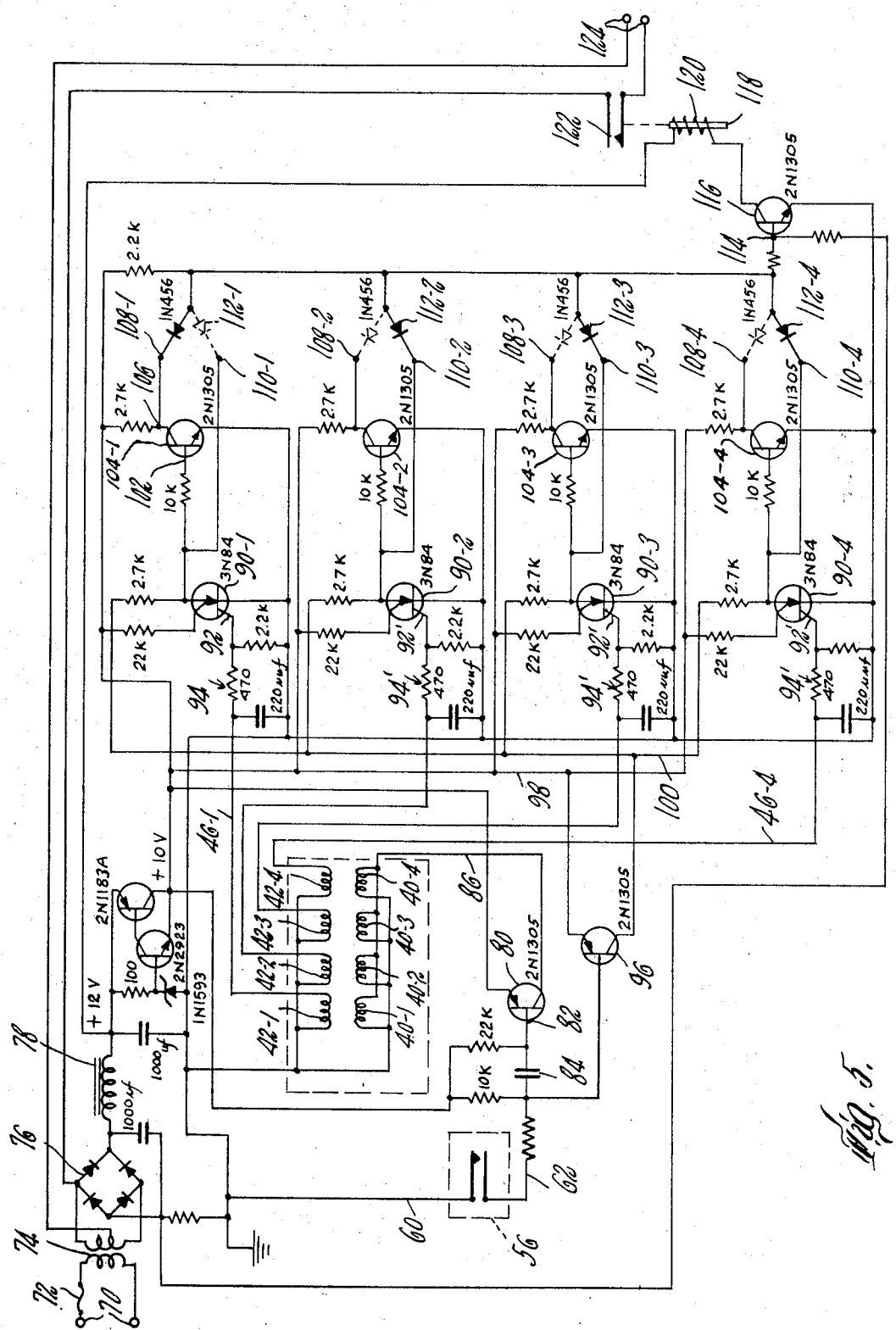
Figure 8:
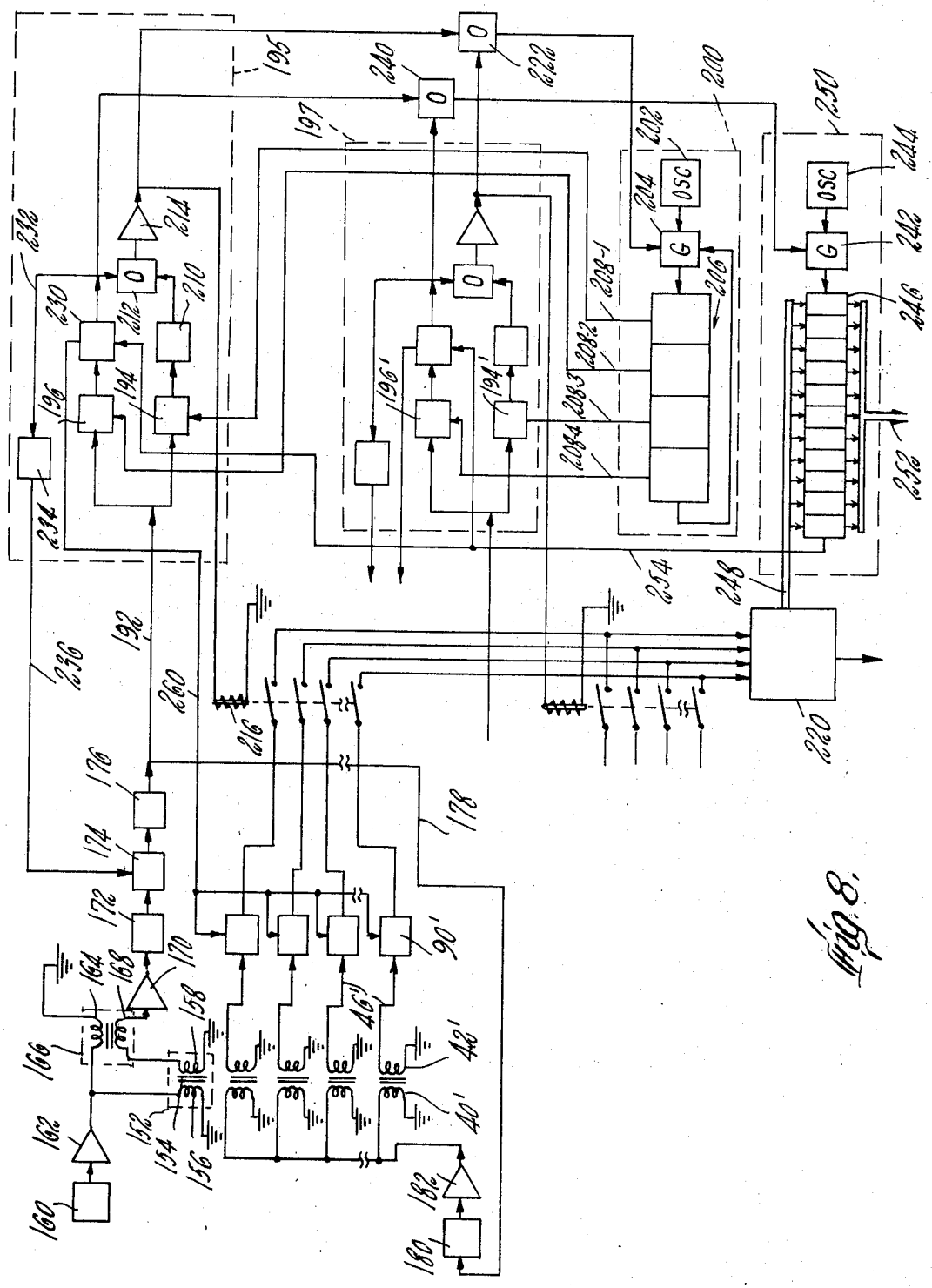

FIGURES 3 and 4 are sectional views of portions of the sensing area taken along the line 3—3 of FIGURE 2 and line 4—4 of FIGURE 3 respectively;

FIGURE 5 is a schematic diagram of electrical circuitry employed in the card reader apparatus shown in FIGURES 1–4;

FIGURE 6 is a diagrammatic view of a second form of card with portions broken away to indicate the nature of elements embedded in the card;

FIGURE 7 is a diagrammatic view of a card reading sensing area arranged for use with the card shown in FIGURE 6; and FIGURE 8 is a block diagram of card reader and control apparatus utilized with the card reader sensor arrangement shown in FIGURE 7.

With reference to FIGURE 1, there is shown a card reader structure 10 for use with a card 12. The card has a plurality of electrically conductive indicia 14 disposed in it. These indicia typically may be discs of copper in the order of 5 mils in thickness. In typical applications, it is preferred that the indicia 14 be encased with an opaque material 16 so that their relative positions in the card are not visible to the card user.

The card reader 10 includes a housing 20 having a slot 22 disposed in the front wall through which the card may be inserted for positioning in a card sensing area 24 disposed behind slot 22. Also, mounted within the housing 20 is electrical control circuitry operated in response to the positioning of a card 12 in the sensing area. Diagrammatic views of the card sensing area are shown in FIGURES 2–4. This card sensing area 20 is defined between an upper member 30 an a lower member 32 which are secured together by suitable means such as bolts 34. The upper and lower members 30, 32 are similar in configuration and have aligned apertures in which are disposed electromagnetic flux conductor members in the form of pole pieces 36, 38. In the arrangement shown in FIGURES 2–4, there are four pole pieces 36 in the upper member 30 and four corresponding pole pieces 38 in the lower member 32 so that when the two members 30, 32 are assembled together the two groups of pole pieces are aligned with one another. Mounted on the pole pieces 36 are similar primary windings 40, and mounted on the pole pieces 38 are secondary windings 42. Leads from the primary windings are brought out of the sensing area structure over conductors 44 and connections from the secondary windings 42 are brought out of the sensing area structure over conductors 46.

In the rear portion of the card sensing area is aperture 50 through which a card sensor rod 52 projects. This rod is biased forwardly by spring 54 and is connected to a switch structure 56 which is mounted on the card sensing structure by bracket 58. When the card 12 is inserted in the sensing area, as indicated in FIGURE 3, the forward edge of the card acts against the rod 52 to move it rearwardly and operate switch 56 to complete an electrical circuit between conductors 60, 62.

As indicated in FIGURES 2 and 3, the primary and secondary winding elements are disposed within recesses in members 30, 32 and it is preferred that those recesses be filled with an epoxy compound or other material such that each member has a smooth inner surface with the ends of the pole pieces 36, 38 flush with that surface so that no impediment to the card 12 exists in the sensing area and the card may be slid in and out easily and without damage.

Electrical control circuitry for use with this card sensing structure is shown in schematic form in FIGURE 5. This circuitry includes terminals 70 to which 115-volt AC signal is applied through a fuse 72 to a primary winding 70 of transformer 74. An output from the secondary of the transformer is rectified by full wave rectifier 76 and smoothed by the smoothing circuit 78 to provide DC voltages of +12 volts and regulated +10 volts as indicated.

A circuit for applying pulses to the sensor element primary winding 40 includes transistor 80, the base electrode 82 of which is connected to a coupling capacitor 84. When the contacts of the microswitch 56 close, a pulse as passed by capacitor 84 is amplified by transistor 80 and applied over line 86 to the primary windings 40.

Connected to each secondary winding 42 is controlled asymmetrically conductive device 90 whose gate electrode 92 is connected to a resistive-capacitive input circuit 94.

An energizing circuit for each controlled rectifier 90 is controlled by a transistor 96. When the base electrode of transistor 96 is connected to ground through switch 56 a conducting condition is established between its emitter electrode connected to the +10 volt source via line 98 and its collector electrode connected to line 100 and thereby the controlled rectifiers 90 are energized so that they will conduct in response to a pulse signal applied to their gate electrodes 92.

Each anode of rectifier 90 is connected to the base electrode 102 of a corresponding inverter transistor 104. The collector electrode 106 of that transistor is connected to first terminal 108 and the anode of the controlled rectifier 90 is connected to second terminal 110. A diode 112 may be connected to either terminal 108 or terminal 110. These diodes 112 are connected in AND circuit arrangement to the base electrode 114 of amplifier transistor 116 which has connected in its collector circuit control the solenoid 118 of a control relay 120 which when energized closes contacts 122. When those terminal contacts are closed, an output signal is applied to terminals 124 for application to the controlled apparatus.

In the circuit arrangement shown in FIGURE 5, diode 112–1 is connected to terminal 108–1; and diodes 112–2, 112–3, and 112–4 are connected to their respective terminals 110. With the arrangement of three copper discs 14 in the card 12 as indicated in FIGURE 2, when that card is in the card sensing area, the three copper discs 14–2, 14–3, and 14–4 will be aligned with the core elements 36–2, 36–3, and 36–4. The card closes switch 56 and a pulse is applied to all four primary windings 40. However, the interposed discs 14 act as shorted turns and substantially no energy is induced in secondary windings 42–2, 42–3, and 42–4. Only transformer secondary 42–1 will produce an output and that output turns on rectifier 90–1. The voltage at terminal 110–1 will fall to ground and at the same time transistor 104 will be turned off so that the voltage at terminal 108–1 rises to approximately +10 volts. The voltages at terminals 110–2, 110–3, and 110–4 remain at approximately +10 volts so that the signal of +10 volts is applied to the base of transistor 114 causing that transistor to conduct and energize solenoid 118 to close contacts 122. It will be noted that until rectifier 90–1 was conducting, the voltage at base electrode 114 of transistor 116 was approximately 0 volt due to the conductive path of diode 112–1 via terminal 108–1 and conducting transistor 104–1. The other terminals connected to diodes 112, 110–2, 110–3, and 110–4 were all at approximately +10 volts, as soon as transistor 96 commenced conducting in response to the insertion of card 12 to close switch 56.

A modified arrangement is shown in FIGURES 6–8. In this arrangement the card 12' has a plurality of copper discs 14' arranged as in the above-described embodiment plus a magnetizable insert 150. In addition to the sensing transformer arrangement disposed within the sensing area, there is a triggering transformer 152 which may be of the same type as disposed in my co-pending patent application, Ser. No. 432,133, now Patent No. 3,422,252. This triggering transformer 152 has a U-shaped magnetic core 154 on which is mounted a primary winding 156, and a secondary winding 158. This triggering transformer is moulded into the upper member 30' of the card sensing area structure so that the two ends of the U-shaped core are flush with the inner surface of that structure. When the card 12' is fully inserted into the card sensing area, the steel shim 150 is positioned to bridge the open ends of the U-shaped core 154 and thus decreases the reluctance of that magnetic flux path. Each of the sensing transformer components on conductors 36', 38' is of the same configuration as the above-described embodiment, in this case the transformers are arranged in a 3 x 4 matrix.

As indicated in FIGURE 8, primary winding 156 is energized from a one hundred kilocycle oscillator 160 via amplifier 162. The primary winding 164 of a reference transformer 166 is also energized and the secondary winding 168 of reference transformer 166 is connected to buck the output of triggering transformer secondary 158 so that no significant output is produced. Secondary 168 is connected to a series of signal modifying circuits including an amplifier 170, a rectifier and filtering circuit 172, a gate 174, and a Schmitt trigger 176. When the card 12' is fully inserted into the card sensing area, as indicated above, so that there is a decrease in the reluctance of the triggering transformer 152, an output signal is produced which is amplified and actuates the Schmitt trigger 176 to apply a level over line 178 to single shot multivibrator 180 that delivers an output pulse via pulse amplifier 182 to pulse to all of the primary windings 40' of the sensing transformers. Each sensing transformer which does not have a copper slug 14' disposed between its primary and secondary windings will produce a detectable output signal on output line 46' to trigger the corresponding pulse storage device 90' or otherwise for storage of data (e.g. an SCR), into conduction.

The output level of the Schmitt trigger is also applied on line 192 to two status storage devices 194 and 196 in card reader control unit 195. These status storage devices also utilize controlled rectifiers connected in a manner such that the storage device 194 is switched into conduction in response to a positive going transition indicative of the positioning of a card in the sensing area and storage device 196 is triggered into conduction in response to a negative going transition produced by trigger 176 when the card is removed from the sensing area. Thus, device 194 stores an indication that a card has been inserted into the card reader and device 196 stores an indication that the card has been removed from the card reader, while devices 90' store indications of the data encoded on the card.

A second card reader control unit 197 includes similar components and is actuated in response to a second card reader (not shown).

The system also includes a card reader programmer 200 which includes an oscillator 202, a gate 204 and a shift register 206. This shift register is indicated as having four stages (two for each card reader) but it will be understood that additional pairs of stages may be added for further card readers employed in the system as desired. Gate 204 is normally open and the oscillator 202 applies pulses to step the shift register 206. In response to each stepping operation, a pulse is applied on output line 208 to sample the card status storage gates of the card reader control units 195 and 197. Output 208-1 samples the "card in" storage device 194, output 208-2 samples the "card out" storage device 196; output 208-3 samples "card in" storage 194' of the second card reader control unit 197; and output 208-4 samples "card out" storage 196' of that unit.

If "card in" storage 194 is set when sampled, the storage device is reset and a pulse is passed to trigger single shot 210 which applies a pulse to OR circuit 212 and amplifier 214 to energize the coil of readout control relay 216. That relay, when energized, closes the corresponding contacts to transfer information stored in storage unit 90' to the authorization circuit 220. Such information may be used for releasing a lock, for example. The output pulse is also applied through OR circuit 222 to close gate 204 and prevent the stepping of the programmer shift register 206. When the pulse from single shot 210 terminates, relay 216 is released and the gate 204 is opened to allow pulses from oscillator 202 to step the shift register 206.

When the card has been withdrawn, the "card out" storage unit 196 is set and the next sampling pulse, on line 208-2, will reset that storage device and pass a pulse to set the print program control unit 230. That control unit, which may be a flip-flop, when set, produces an output level on line 232 to disable DC voltage generator 234 and remove the conditioning level on line 236 from gate 174.

That output level from unit 230 is also applied through OR circuit 212 and amplifier 214 to energize the data storage readout control relay 216, and to disable programmer control gate 204 (via OR circuit 222). The output level further is applied through OR circuit 240 to condition (open) gate 242 of the print programming unit 250. That unit includes, in addition to gate 242, an oscillator 244 and a shift register 246. When gate 242 is conditioned, pulses from oscillator 244 step the shift register 246 to transfer information from the several input lines 248 sequentially to the output lines 252 for recording information applied to the shift register input lines, in a printing operation for example. This information is applied to the input lines 248 from the logic matrix 220 as a function of information stored in card reader storage units 90' via the closed contacts of readout control relay 216. The information transfer is terminated by an end carry (on line 254) from the shift register 246 which is applied to reset control unit 230 to remove the output levels on line 232. On reset of the print program control unit 230, an output pulse was applied from that unit over line 260 which removes (for a short interval) the conditioning potential from the SCR storage units 90' to allow them to reset in preparation for readout of the next card inserted in the card reader. This is in contrast with the arrangement shown in FIGURE 5 in which the storage elements are reset in response to the removal of the card from the sensing area. Also, the inhibit level on line 236 is removed so that another sampling pulse may be applied to primary windings 40'. Should another card have been inserted in the sensing area, the resulting transition will immediately actuate the Schmitt trigger 176 to translate the data on the card to the storage device 90'.

The removal of ouput level from line 232 permits the control shift register 206 to resume stepping and sense the next card reader control unit 197. This sequential scanning proceeds through all the card readers employed in the system and then returns to scan the first card reader unit again. It will be noted that each card reader control unit 195, 197 includes two control storage units, one of which is set upon insertion of the card and the second of which is set upon removal of the card. Both are reset in a sequential readout operation by the sampling signals from the card reader programmer shift register 206.

Thus, it will be seen that the invention provides a data handling system employing control devices operative in response in coordinated manner to indicia which may be coded and encased in a card and which may be in the form of sheet metal shims of predetermined characteristics. Each device, in a simple and relatively inexpensive structure, reliably provides an output in response to a coded input in a system that is difficult to compromise. Data storage is coupled directly (without the necessity of amplifiers) to the card sensors. Further, these storage units may be read out from a remote location through simple control logic. While particular embodiments of the invention have been shown and described, various modifications thereof will be apparent to those skilled in the art and, therefore, it is not intended that the invention be limited to the disclosed embodiments or to details thereof, and departures may be made therefrom within the spirit and scope of the invention as defined in the claims.

What is claimed is:
1. Apparatus for sensing an article having discrete areas of non-magnetic electrically conductive material thereon different from other areas of the article, comprising means defining an article sensing area, a plurality of electro-magnetic sensors disposed adjacent said sensing area, each said electromagnetic sensor including a primary winding disposed on one side of said area and a secondary winding disposed on the opposite side of said area so that the article to be sensed may be interposed between said primary and secondary windings, means responsive to the insertion of an article in said sensing area to apply an electrical pulse to all of said primary windings simultaneously to induce a detectable output signal in each of said secondary windings in the absence of electrically conductive material carried by the article disposed in said sensing area interposed between each said primary winding and its corresponding secondary winding, each said area of non-magnetic electrically conductive material interposed between a primary winding and its corresponding secondary winding absorbing the field radiated by said primary winding so that that corresponding secondary winding does not produce a detectible output signal, a plurality of storage elements corresponding in number to said sensors, each said storage element comprising a controlled rectifier having a control electrode and passive means connecting each said secondary winding to the control electrode of the corresponding controlled rectifier so that an output signal from the connected sensor changes the state of conduction of the controlled rectifier.

2. The apparatus as claimed in claim 1, and further including a translation matrix coupled to said plurality of storage elements and means responsive to operation of said translation matrix to reset said storage elements.

3. The apparatus as claimed in claim 1 wherein said electrical signal applying means includes a switch disposed for operation in response to the insertion of an article into said sensing area.

4. Apparatus for sensing an article having discrete areas of non-magnetic electrically conductive material thereon different from other areas of the article, comprising means defining an article sensing area, a plurality of electromagnetic sensors disposed adjacent said sensing area, each said electromagnetic sensors disposed adjacent said sensing area, each said electromagnetic sensor including a primary winding disposed on one side of said area and a secondary winding disposed on the opposite side of said area so that the article to be sensed may be interposed between said primary and secondary windings, and means including electrical signal applying means comprising a sensing element disposed adjacent said sensing area for producing an output in response to an article positioned in said sensing area and a reference element connected to said sensing element for neutralizing the output of said sensing element in the absence of an article in said sensing area, means responsive to the insertion of an article in said area to apply an electrical pulse to all of said primary windings simultaneously to induce a detectable output signal in each of said secondary windings in the absence of electrically conductive material carried by the article disposed in said sensing area interposed between each said primary winding and its corresponding secondary winding, each said area of non-magnetic electrically conductive material interposed between a primary winding and its corresponding secondary winding absorbing the field radiated by said primary winding so that that corresponding secondary winding does not produce a detectable output signal, a plurality of storage elements corresponding in number to said sensors, and passive means connecting each said storage element to the secondary winding of the corresponding sensor, each said electrical signal applied to said primary windings inducing flux flow in said flux paths for producing output signals in said secondary windings as a function of the conductor elements carried by the article disposed in said sensing area, and said output signals changing the condition of said storage elements for storing indications of the data encoded on the article disposed in said sensing area in said storage elements.

5. The apparatus as claimed in claim 4 wherein said sensing and reference elements are electrical transformers.

6. Data translation apparatus for translating data encoded on a non-metallic article in the form of metallic elements disposed in a particular configuration, comprising
an article reader including means defining an article sensing area,
a matrix of electromagnetic sensors disposed adjacent said sensing area,
each said sensor including means defining a magnetic flux path having a portion thereof immediately adjacent said article sensing area,
a primary winding for inducing flux flow in said flux path,
and a secondary winding responsive to flux flow in said flux path,
and means responsive to the insertion of an article into said sensing area defining means to apply an electrical signal to the primary windings of said sensors,
a plurality of storage elements corresponding in number to said sensors, and passive means connecting each said storage element to the secondary winding of the corresponding sensor, each said electrical signal applied to said primary windings inducing flux flow in said flux paths for producing output signals in said secondary windings as a function of the metallic elements carried by the article disposed in said sensing area, and said output signals changing the condition of said storage elements for storing indications of the data encoded on the article disposed in said sensing area in said storage elements.

7. Data translation apparatus for translating data encoded on an article in the form of metallic elements disposed in a particular configuration, comprising
an article reader including means defining an article sensing area,
a matrix of electromagnetic sensors disposed adjacent said sensing area,
each said sensor including means defining a magnetic flux path having a portion thereof immediately adjacent said article sensing area,
a primary winding for inducing flux flow in said flux path,
and a secondary winding responsive to flux flow in said flux path,
and means responsive to the insertion of an article into said sensing area defining means to apply an electrical signal to the primary windings of said sensors,
a plurality of storage elements corresponding in number to said sensors, passive means connecting each said storage element to the secondary winding of the corresponding sensor, each said electrical signal applied to said primary windings inducing flux flow in said flux paths for producing output signals in said secondary windings as a function of the metallic elements carried by the article disposed in said sensing area, and said output signals changing the condition of said storage elements for storing indications of the data encoded on the article disposed in said sensing area in said storage elements, a utilization device and control means responsive to the removal of the article from said sensing area for reading out the information stored in said storage elements to said utilization device.

8. The system as claimed in claim 7 and further including control means responsive to the removal of the article from said sensing area for resetting said storage elements.

9. The system as claimed in claim 7 and further including first control means responsive to the read out of information stored in said storage elements for resetting said storage elements.

10. The system as claimed in claim 9 and further including second control means responsive to the removal of an article from said sensing area for inhibiting application of said electrical signal to said primary windings until operation of said first control means to reset said storage elements.

11. The system as claimed in claim 6 wherein the metallic elements carried by the article are electrical conductors which function as shorted turns when disposed adjacent said flux path.

12. The system as claimed in claim 11 wherein each said storage element is a controlled rectifier device having a control electrode and further including passive means connecting each said control electrode to the secondary winding of said corresponding sensor such that the output signal from the secondary winding changes the state of conduction of said controlled rectifier.

13. The system as claimed in claim 12 wherein said electrical signal applying means includes a switch disposed for operation in response to the insertion of an article into said sensing area.

14. The system as claimed in claim 12 wherein said electrical signal applying means includes a sensing element disposed adjacent said sensing area for producing an output in response to an article positioned in said sensing area, and
a reference element connected to said sensing element for neutralizing the output of said sensing element in the absence of an article in said sensing area.

15. The system as claimed in claim 14 wherein said sensing and reference elements are electrical transformers.

16. Data translation apparatus for translating data encoded on an article in the form of non-magnetic metallic electrical conductor elements disposed in a particular configuration, comprising
an article reader including means defining an article sensing area,
a matrix of electromagnetic sensors disposed adjacent said sensing area,
each said sensor including means defining a magnetic flux path having a portion thereof immediately adjacent said article sensing area,
a primary winding for inducing flux flow in said flux path,
and a secondary winding responsive to flux flow in said flux path,
a sensing transformer disposed adjacent said sensing area for applying an electrical signal to the primary windings of said sensors in response to an article positioned in said sensing area,
a reference transformer connected to said sensing transformer for neutralizing the output of said sensing transformer in the absence of an article in said sensing area,
a plurality of controlled rectifier devices corresponding in number to said sensors, each said controlled rectifier device having a control electrode, passive means connecting each said control electrode to the secondary winding of the corresponding sensor, each said electrical signal applied to said primary windings inducing flux flow in said flux paths for producing output signals in said secondary windings as a function of the metallic elements carried by the article disposed in said sensing area, and said output signals changing the condition of said storage elements for storing indications of the data encoded on the article disposed in said sensing area in said storage elements,
a decoding matrix and a translation control,
first control means responsive to the insertion of an article into said sensing area to connect said storage elements to said decoding matrix,
second control means responsive to removal of said article from said sensing area to connect said translation control to said storage elements to translate data stored in said storage elements to a utilization device,
and third control means responsive to said second control means to inhibit application of said electrical signal to said primary windings.

17. The system as claimed in claim 6 wherein each said storage element is a controlled rectifier device having a control electrode and passive means connecting each said control electrode to the secondary winding of said corresponding sensor such that the output signal from the secondary winding changes the state of conduction of said controlled rectifier.

18. For use in data translation apparatus comprising
an article reader including means defining an article sensing area,
a matrix of electromagnetic sensors disposed adjacent said sensing area,
each said sensor including a primary winding for generating flux for flow in a magnetic flux path having a portion thereof immediately adjacent said article sensing area,
and a secondary winding responsive to flux flow in said flux path,
an article for insertion into said article sensing area, said article having embedded in it a plurality of discrete non-magnetic electrically conductive elements, each said element providing a closed electrically conductive path and functioning as a shorted turn when disposed adjacent a flux path of a sensor in said sensing area for absorbing the flux in that path and preventing the secondary winding of that sensor from producing an output signal in response to flux in said flux path.

19. The article as claimed in claim 18 wherein each said discrete electrically conductive element is a sheet of non-magnetic metal in the order of 5 mils in thickness.

20. The article as claimed in claim 19 wherein each said sheet element is a copper disc.

21. A control system comprising an article having a plurality of discrete electrical conductor elements thereon, each said element providing a continuous direct current path that functions as a shorted turn when disposed in a magnetic flux field, and electrical insulating material separating said elements from one another; and article sensing apparatus comprising means defining an article sensing area, an array of elements sensors disposed adjacent aid sensing area, each aid sensor including primary winding disposed on one side of said sensing area, and a secondary winding disposed on the opposite side of said sensing area so that a single conductor element on said article may be interposed between said primary and secondary windings, means to apply electrical pulse signals to said primary windings to induce effective output signals in the corresponding secondary windings in the absence of electrical conductor elements carried by the article disposed in said sensing area interposed in said flux path, each said electrical conductor element, when interposed in said flux path, functioning as a shorted turn to absorb energy radiated by the adjacent primary winding in response to a pulse signal applied thereto so that the corresponding secondary winding does not produce an effective output signal, a plurality of storage elements corresponding in number of said sensors, and passive means connecting each said storage element to the secondary winding of the corresponding sensor, each said electrical signal applied to said primary windings inducing flux flow in said flux paths for producing output signals in said secondary windings as a function of the conductor elements carried by the article disposed in said sensing area, and said output signals changing the condition of said storage elements for storing indications of the data encoded on the article disposed in said sensing area in said storage elements.

References Cited

UNITED STATES PATENTS

| | | |
|---|---|---|
| 2,914,746 | 11/1959 | James. |
| 2,774,060 | 12/1956 | Thompson _____ 235—61.12 X |
| 3,174,057 | 3/1965 | Cake _____ 307—284 |
| 3,210,527 | 10/1965 | Daykin. |
| 3,373,264 | 3/1968 | Damerau. |

MAYNARD R. WILBUR, Primary Examiner

T. J. SLOYAN, Assistant Examiner

U.S. Cl. X.R.

340—149